(12) United States Patent
Lee et al.

(10) Patent No.: US 7,452,634 B2
(45) Date of Patent: Nov. 18, 2008

(54) POLYMER ELECTROLYTE COMPOSITION FOR RECHARGEABLE LITHIUM BATTERY AND RECHARGEABLE LITHIUM BATTERY FABRICATED USING SAME

(75) Inventors: Yong-Beom Lee, Suwon-si (KR); Eui-Hwan Song, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 566 days.

(21) Appl. No.: 10/948,117

(22) Filed: Sep. 23, 2004

(65) Prior Publication Data

US 2005/0084764 A1   Apr. 21, 2005

(30) Foreign Application Priority Data

Sep. 24, 2003   (KR)   .................... 10-2003-0066261

(51) Int. Cl.
*H01M 10/40* (2006.01)
(52) U.S. Cl. ............... 429/317; 429/231.8; 429/231.95; 429/314; 526/318.43
(58) Field of Classification Search .............. None
See application file for complete search history.

(56) References Cited

U.S. PATENT DOCUMENTS 4,414,278 A * 11/1983 Cohen et al. ................ 428/402

(Continued)

FOREIGN PATENT DOCUMENTS

| JP | 2002-198095 | * 7/2002 |
|---|---|---|
| JP | 2002-216845 | 8/2002 |

OTHER PUBLICATIONS

Patent Abstracts of Japan for Publication No. 2002-216845; dated Aug. 2, 2002 in the name of Seiji Maeda, et al.

Primary Examiner—Patrick Ryan
Assistant Examiner—Tony Chuo
(74) Attorney, Agent, or Firm—Christie, Parker & Hale, LLP

(57) ABSTRACT

Disclosed is a polymer electrolyte composition for a rechargeable lithium battery including a multifunctional monomer represented by formula 1, a polymer initiator, a non-aqueous organic solvent, and a lithium salt:

(1)

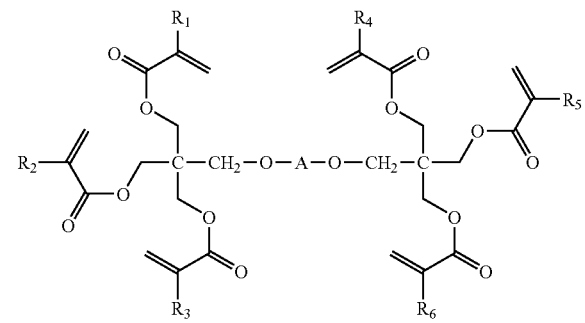

where A is one represented by one of formulae 1a, 1b, or 1c;

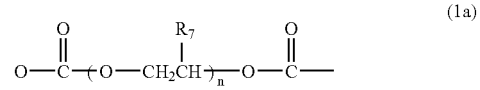

(1a)

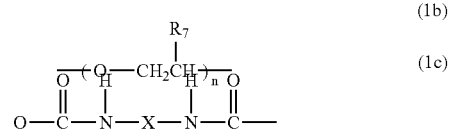

where n is an integer of 1 to 10; $R_1$ to $R_7$ are the same or are independently selected from H, $C_1$ to $C_3$ alkyls, and C≡N; and X is a $C_1$ to $C_{20}$ aliphatic or aromatic carbon, or polyether.

16 Claims, 1 Drawing Sheet

U.S. PATENT DOCUMENTS

| | | |
|---|---|---|
| 4,830,939 A | 5/1989 | Lee et al. |
| 4,886,716 A | 12/1989 | Roggero et al. |
| 4,908,283 A | 3/1990 | Takahashi et al. |
| 6,465,135 B1 * | 10/2002 | Nishimura et al. .......... 429/309 |
| 2001/0024756 A1 * | 9/2001 | Yamasaki ................... 429/303 |
| 2002/0031710 A1 * | 3/2002 | Kezuka et al. .............. 429/303 |
| 2004/0197662 A1 * | 10/2004 | Maruyama et al. .......... 429/303 |

* cited by examiner

US 7,452,634 B2

POLYMER ELECTROLYTE COMPOSITION FOR RECHARGEABLE LITHIUM BATTERY AND RECHARGEABLE LITHIUM BATTERY FABRICATED USING SAME

CROSS REFERENCE TO RELATED APPLICATION

This application is based on and claims priority to Korean Patent Application No. 10-2003-0066261 filed in the Korean Intellectual Property Office on Sep. 24, 2003, the entire disclosure of which is incorporated hereinto by reference.

FIELD OF THE INVENTION

The present invention relates to a polymer electrolyte composition for a rechargeable lithium battery and a rechargeable lithium battery fabricated using the same, and more particularly, to a polymer electrolyte composition for a rechargeable lithium battery exhibiting good high-temperature swelling characteristics and a rechargeable lithium battery fabricated using the same.

BACKGROUND OF THE INVENTION

Recently, the rapid development of smaller, lighter, and higher performance electronic and communication equipment has required the development of high performance and large capacity batteries to power such equipment. The demands for large capacity batteries have prompted investigation into rechargeable lithium batteries. Positive active materials for rechargeable lithium batteries use lithium-transition metal oxides, and negative active materials use crystalline or amorphous carbonaceous materials or carbon composites. The active materials are coated on a current collector with a predetermined thickness and length, or they are formed as a film, to produce electrodes. The electrodes together with a separator are wound to produce an electrode element, and the electrode element is inserted into a battery case such as a can followed by insertion of an electrolyte to fabricate a battery.

The electrolyte includes lithium salts and organic solvents. The organic solvents may be mixed solvents of between two and five components which may include cyclic carbonates such as ethylene carbonate and propylene carbonate, and linear carbonates such as dimethyl carbonate, ethylmethyl carbonate, and diethyl carbonate. However, these solvents are known to severely expand at high temperatures, causing a swelling phenomenon. The swelling phenomenon is due to the generation of gas due to the decomposition of the electrolyte at high temperatures in the battery.

Several attempts to reduce such a swelling phenomenon have been attempted. U.S. Pat. No. 4,830,939 discloses a polymer electrolyte including polyethylenically unsaturated monomeric materials or prepolymonomeric materials, and U.S. Pat. No. 4,886,716 discloses a polymer electrolyte including a cross-linked polyether which is a copolymerization product of a vinyl-ether. U.S. Pat. No. 4,908,283 discloses a polymer electrolyte including acryloyl-denatured polyalkylene oxide.

The conventional attempts for reducing the high-temperature swelling phenomenon are based on the cross-linking of a multifunctional monomer in which the main chain is a poly(alkylene oxide) or a polyalkylene unit. However, these attempts still have problems associated with the high-temperature swelling phenomenon.

SUMMARY OF THE INVENTION

It is an aspect of the present invention to provide a polymer electrolyte composition for a rechargeable lithium battery which is a capable of inhibiting high-temperature swelling.

It is another aspect to provide a rechargeable lithium battery fabricated using the composition.

These and other aspects may be achieved by a polymer electrolyte for a rechargeable lithium battery comprising the polymerization reaction product of a polymer reactant mixture comprising a multifunctional monomer represented by formula 1; a polymerization initiator; a non-aqueous organic solvent; and a lithium salt:

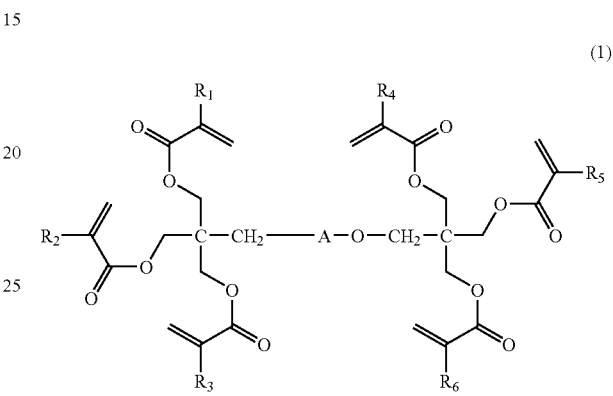

(1)

where A is represented by one of formula 1a, 1b, or 1c;

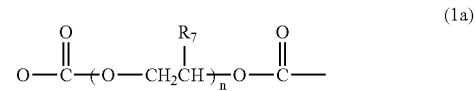

(1a)

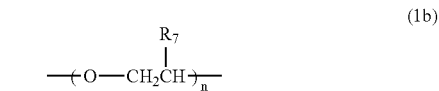

(1b)

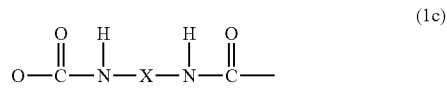

(1c)

where n is an integer from 1 to 10;

$R_1$ to $R_7$ are the same or are independently selected from H, $C_1$ to $C_3$ alkyls, and C≡N; and X is a $C_1$ to $C_{20}$ aliphatic or aromatic carbon, or polyether.

In order to achieve these aspects and others, the present invention provides a rechargeable lithium battery including a polymer electrolyte obtained by polymerization of the polymer reactant mixture; a positive electrode including a positive active material in which lithium intercalation reversibly occurs; and a negative electrode including a negative active material in which lithium intercalation reversibly occurs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION

Figure 1:
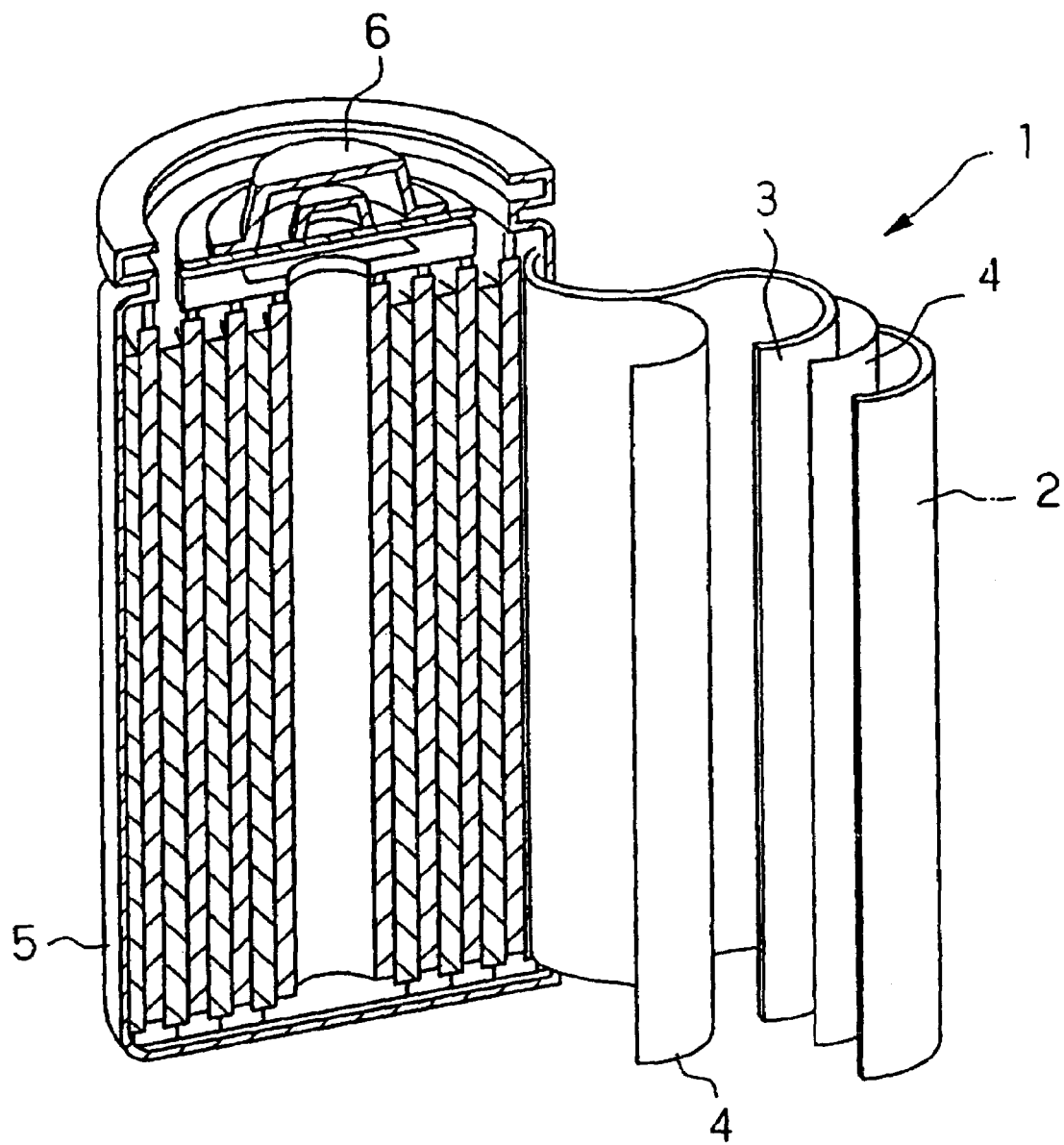
FIG. 1 is a schematic view showing a rechargeable lithium battery according to the present invention.

The present invention relates to a polymer electrolyte for a rechargeable lithium battery that has improved high-temperature swelling characteristics.

The polymer reactant mixture used in producing the electrolyte of the present invention includes a multifunctional monomer represented by formula 1, a polymerization inhibitor, a non-aqueous organic solvent, and a lithium salt:

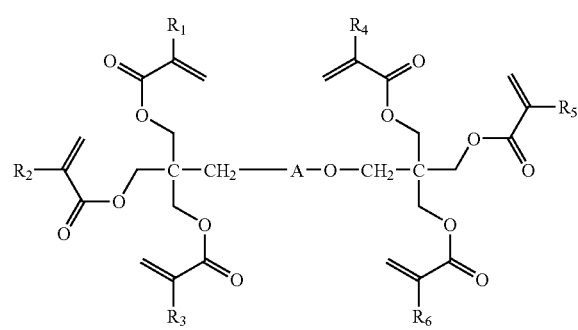

(1)

where A is represented by one of formulae 1a, 1b, or 1c;

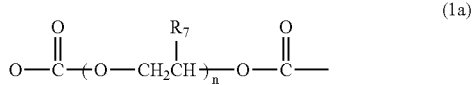

(1a)

(1b)

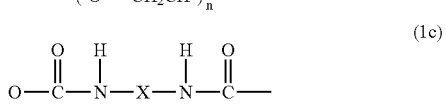

(1c)

where n is an integer from 1 to 10;

$R_1$ to $R_7$ are the same or are independently selected from H, $C_1$ to $C_3$ alkyls, or $C\!\!=\!\!N$; and X is a $C_1$ to $C_{20}$ aliphatic or aromatic carbon, or polyether.

The multifunctional monomer is preferably presented in the amount of 0.5 to 20 wt % in the polymer reactant mixture. An amount of less than 0.5 wt % of the multifunctional monomer causes difficulty in cross-linking. An amount of more than 20 wt % deteriorates the battery performance.

The polymerization initiator may be any initiator or combination of initiators that can initiate polymerization of the multifunctional monomer represented by formula 1 without causing significant deterioration of the battery's performance. Examples of initiators include organic peroxides and azo-based compounds. Organic peroxide initiators include peroxy dicarbonates such as di(4-t-butylcyclohexyl) peroxydicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate 1,6-bis(t-butyl peroxycarbonyloxy) hexane, and diethylene glycol-bis(t-butyl peroxy dicarbonate), diacyl peroxides such as diethylene glycol-bis(t-butyl peroxy carbonate); diacetyl peroxide, dibenzoyl peroxide, dilauroyl peroxide, and bis-3,5,5-trimetyl hexanoyl peroxide; peroxy esters such as t-butyl peroxy pivalate, t-amyl peroxy pivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethyl-hexanoate, t-amyl peroxy 2-ethyl hexanoate, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate. Suitable azo-based compounds include 2,2'-azo-bis (isobutyronitrile), 2,2'-azo-bis(2,4-dimethylvaleronitrile) and 1,1'-azo-bis(cyanocyclo-hexane).

The polymerization initiator is present in an amount sufficient to initiate polymerization of the monomer and is suitably present in an amount from 0.01 to 5 wt %.

The polymer reactant mixture may further include an ethylenically unsaturated monofunctional or multifunctional compound. Suitable monofunctional or multifunctional compounds include alkyl or alkoxy (meth)acrylate such as methyl (meth)acrylate, ethyl (meth)acrylate, methoxyethyl (meth) acrylate, and ethoxyethyl (meth)acrylate; vinyl acetates such as, vinyl acetate, vinyl pivalate, or vinyl propionate; vinyl pyridine, vinyl pyrrolidone, polyethyleneglycol diacrylate, polyethylene glycol diacrylate, polyethyleneglycol dimethacrylate, vinyl acrylate; trimethylpropane tri(meth) acrylate and derivatives thereof, pentaerythritol tetra(meth) acrylate) and derivatives thereof, and dipentaerythritol hexa (meth)acrylate and derivatives thereof.

The monofunctional or multifunctional compound is present in an amount from 0.01 to 10 parts by weight based on 100 parts by weight of the total polymer reactant mixture.

The polymer reactant mixture includes a non-aqueous organic solvent and a lithium salt which are generally used in liquid electrolytes, together with the monomer, the polymerization initiator, and optional monofunctional or multifunctional compounds.

The lithium salt acts as a source for supplying lithium ions in the battery, and helps in the operation of the battery. Examples of lithium salts include $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ (where x and y are natural numbers), $LiSO_3CF_3$, and mixtures thereof. The concentration of the lithium salt is 0.6 to 2.0M, and preferably 0.7 to 1.6M. If the concentration of the lithium salt is less than 0.6M, the viscosity of the electrolyte decreases, thereby deteriorating the electrolyte performance. If the concentration of the lithium salt is more than 2.0M, the viscosity increases, thereby reducing transfer of lithium ions.

The non-aqueous organic solvent acts as a medium for transporting ions that participate in the electrochemical reactions. Examples of the non-aqueous organic solvent include carbonates, esters, ethers, ketones, nitriles and combinations thereof. Suitable carbonates include dimethyl carbonate, ethylmethyl carbonate, diethyl carbonate, dipropyl carbonate, dibutyl carbonate, ethylene carbonate, propylene carbonate, and butylene carbonate. Suitable esters include methyl acetate, ethyl acetate, methyl hexanoate, and methyl formate. Suitable ether includes dibutylether. Suitable ketones include γ-butyrolactone, γ-valerolactone, γ-caprolactone, δ-valerolactone, and ε-caprolatone. Suitable nitriles include acetonitrile.

A polymer electrolyte may be produced by polymerization of the polymer reactant mixture as in the following exemplary procedures. According to one method, the polymer reactant mixture is injected into a battery case such as a metal can or a pouch in which a positive electrode, a separator, and a negative electrode are placed, and is then heated at 40 to 100° C. for 30 minutes to 8 hours, thereby polymerizing the polymer reactant mixture to produce the polymer electrolyte. According to another method, the polymer reactant mixture is coated on a positive or a negative electrode, and heat, ultraviolet ray, or electron beams are irradiated into the electrode to polymerize the polymer reactant mixture, thereby coating the surface of the positive or negative electrode with the polymer electrolyte. The produced electrode is inserted into a battery case and sealed to fabricate a battery. A separator may be additionally used, or alternatively the polymer electrolyte may act as the separator, making the use of a separator optional.

A rechargeable lithium battery including the polymer electrolyte of the present invention includes a positive electrode and a negative electrode.

The positive electrode includes a positive active material in which lithium intercalation reversibly occurs. Suitable positive active material include lithiated intercalation compounds, and examples of positive active materials include compounds represented by formulas 2 to 13.

$$Li_xMn_{1-y}M_yA_2 \quad (2)$$

$$Li_xMn_{1-y}M_yO_{2-z}X_z \quad (3)$$

$$Li_xMn_2O_{4-z}X_z \quad (4)$$

$$Li_xCo_{1-y}M_yA_2 \quad (5)$$

$$Li_xCo_{1-y}M_yO_{2-z}X_z \quad (6)$$

$$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

where $0.90 \leq x \leq 1.1$; $0 \leq y \leq 0.5$; $0 \leq z \leq 0.5$; $0 \leq \alpha \leq 2$;

M is at least one element selected from Al, Ni, Co, Mn, Cr, Fe, Mg, Sr, V, and rare earth elements; and A is selected from O, F, S, or P; and X is F, S, or P.

The negative electrode includes a negative active material in which lithium intercalation reversibly occurs. Examples of negative active material include carbonaceous materials such as crystalline carbon, amorphous carbon, or carbon composites.

The positive and the negative electrode are respectively produced by mixing the active material, a conductive agent, and a binder in a solvent to prepare an active material composition, and coating the composition on a current collector. The electrode preparation is well known in the related art, and easily understood by one of ordinary skill in the art.

The conductive agent includes any conventional conductive agent used for an active material composition, as long as it is chemically inert and has electrical conductivity. Examples include natural graphite, artificial graphite, carbon black, acetylene black, ketjen black; carbon fiber, metal fibers such as copper, nickel, aluminum, or silver, and combinations thereof.

The binder includes any conventional binder used for an active material composition as long as it firmly adhere to the active material and the conductive agent on the current collector. Suitable binders include polyvinyl alcohol, carboxymethylcellulose, hydroxylpropylenecellulose, diacetylenecellulose, polyvinylchloride, polyvinylpyrrolidone, polytetrafluoroethylene, polyvinylidene fluoride, polyethylene, and polypropylene.

The solvent includes any conventional solvent used for an active material composition as long as it will distribute the active material, the conductive agent, and the binder. Examples of suitable solvents include N-methyl pyrrolidone.

An embodiment of the rechargeable lithium battery of the present invention is shown in FIG. 1. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic battery, a pouch type battery or other types of batteries as are well understood in the related art.

The following Examples further illustrate the present invention in detail, but are not to be construed to limit the scope thereof.

Synthesis of Pentaerythritol triacryloyl tri(ethylene glycol) bisformate (formula 1, wherein n is 3, and $R_1$ to $R_7$ are H)

Pentaerythritol triacrylate (0.02 mol, 5.966 g) and triethyl amine (0.0222 mol, 2.224 g) were dissolved in 17.4 g of toluene in a 100 ml three-neck flask fitted with a nitrogen inlet and a thermometer. The resulting mixture was shaken in an ice-water bath, and tri(ethylene glycol) bischloroformate (0.01 mol, 2.751 g) and toluene (17.4 g) were added thereto under a nitrogen atmosphere. After completion of the addition, the temperature was increased by 25° C. and the reaction was performed. A white salt precipitate formed and was filtered. The resulting filtered product was evaporated under a reduced pressure and washed followed by additional evaporation under a reduced pressure to prepare a product comprising pentaerythritol triacyloyl tri(ethylene glycol) bisformate. The product was then refrigerated.

EXAMPLE 1

0.5 g of pentaerythritol triacyloyl tri(ethylene glycol) bisformate obtained as set forth above and a di(4-t-butylcyclohexyl)peroxydicarboante polymerization initiator were added to 1.3M $LiPF_6$ in a mixed solvent of ethylene carbonate, ethyl methyl carbonate, propylene carbonate and fluorobenzene (30:55:10:5 volume ratio) and mixed to prepare a polymer reactant mixture or pregel solution. A jelly roll configuration was produced by winding a positive electrode, a separator, and a negative electrode together and inserting the wound configuration into a battery case. To the battery case, 2.1 g of the pregel solution were added. The resulting battery case was sealed and heated in a 65° C. heat-wind oven for 4 hours to polymerize the pregel solution and fabricate a polymer cell. The positive electrode included a mixed positive active material of $LiNi_{0.8}Co_{0.1}Mn_{0.1}O_2$ and $LiCoO_2$ at a weight ratio of 8:2, and the negative electrode included a pitch-coated graphite negative active material. The separator was a polyethylene film, available from Tonnen, Co., Ltd.

COMPARATIVE EXAMPLE 1

A polymer cell was fabricated by the same procedure as in Example 1, except that dipentaerythritol hexacrylate was used instead of pentaerythritol triacryloyl tri(ethylene glycol) bisformate.

The battery capacities were measured by constant-current and constant-voltage charging of the cells of Example 1 and Comparative Example 1 at a 0.5 C charge rate and a cut-off of 4.2V and 20 mAh, and constant-current discharging at 0.2 C and a cut-off of 2.75V. The capacity for Example 1 was 900 mAh and higher than that of Comparative Example 1 which was 850 mAh.

The cells according to Example 1 and Comparative Example 1 were then charged at 0.5 C and a cut-off of 4.2V and 20 mAh, and the charged cells were allowed to stand in an oven at 90° C. for 4 hours. Thereafter, the thicknesses or swelling characteristics of the cells were measured. The increase in the thickness for the cell of Example 1 was 3% indicating good swelling suppression and good swelling characteristics. In contrast, the increase in thickness for the cell of Comparative Example 1 was 10.3% indicating poor swelling characteristics. Thus, the polymer electrolyte produced by the composition of the present invention suppresses swelling at high temperatures while still providing a rechargeable lithium battery with high capacity.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A polymer electrolyte for a rechargeable lithium battery, comprising the polymerization reaction product of a polymer reactant mixture comprising:
   a multifunctional monomer represented by formula 1;
   a polymerization initiator;
   a non-aqueous organic solvent; and
   a lithium salt:

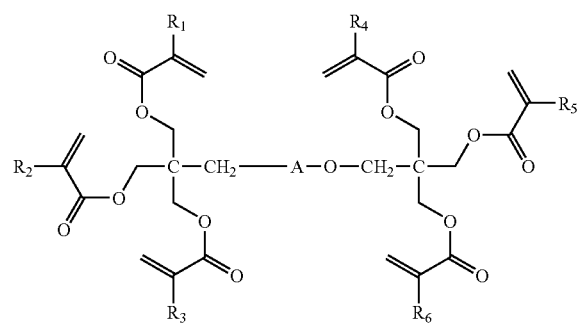

(1)

where A is selected from formulae 1a and 1c;

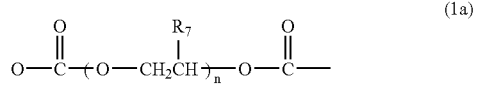

(1a)

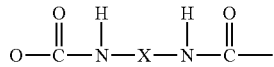

(1c)

where n is an integer from 1 to 10;
$R_1$ to $R_7$ are the same or are independently selected from H, $C_1$ to $C_3$ alkyls, and C≡N; and
X is a $C_1$ to $C_{20}$ aliphatic or aromatic carbon, or polyether.

2. The polymer electrolyte of claim 1, further comprising at least one ethylenically unsaturated monofunctional or multifunctional compound.

3. The polymer electrolyte of claim 1, wherein the multifunctional monomer is present in an amount from 0.5 to 20 wt %.

4. The polymer electrolyte of claim 1, wherein the non-aqueous organic solvent is present in an amount from 80 to 99.5 wt %.

5. The polymer electrolyte of claim 1, wherein the polymerization initiator is an organic peroxide or an azo-based compound.

6. The polymer electrolyte of claim 5, wherein the polymerization initiator is selected from the group consisting of: peroxy dicarbonates selected from the group consisting of di(4-t-butylcyclohexyl) peroxydicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate 1,6-bis(t-butyl peroxycarbonyloxy) hexane; and diethylene glycol-bis (t-butyl peroxy dicarbonate); diacyl peroxides selected from the group consisting of diethylene glycol-bis(t-butyl peroxy carbonate), diacetyl peroxide, dibenzoyl peroxide, dilauroyl peroxide, and bis-3,5,5-trimetyl hexanoyl peroxide; peroxy esters selected from the group consisting of t-butyl peroxy pivalate, t-amyl peroxy pivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethylhexanoate, t-amyl peroxy 2-ethyl hexanoate, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate; azo-based compounds selected from the group consisting of 2,2'-azo-bis(isobutyronitrile), 2,2'-azo-bis(2,4-dimethylvaleronitrile), and 1,1'-azo-bis(cyanocyclo-hexane); and combinations thereof.

7. The polymer electrolyte of claim 1, wherein the lithium salt is selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ where x and y are natural numbers, $LiSO_3CF_3$, and mixtures thereof.

8. The polymer electrolyte of claim 1, wherein the non-aqueous organic solvent is selected from the group consisting of carbonates, esters, ethers, ketones, nitriles and mixtures thereof.

9. A rechargeable lithium battery comprising:
   a positive electrode comprising a positive active material in which lithium intercalation reversibly occurs;
   a negative electrode comprising a negative active material in which lithium intercalation reversibly occurs; and
   a polymer electrolyte obtained by polymerizing a polymer reactant mixture comprising a multifunctional monomer represented by formula 1, a polymerization initiator, a non-aqueous organic solvent, and a lithium salt:

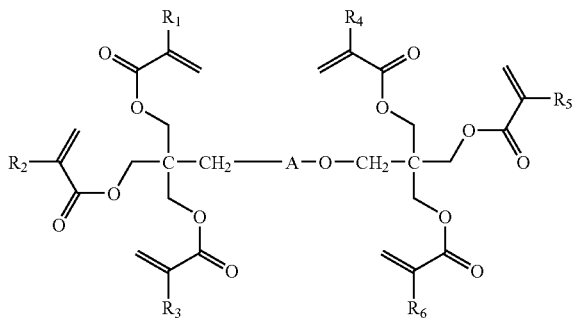

where A is one represented by one of formula 1a or 1c;

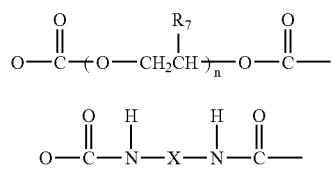

where n is an integer from 1 to 10, $R_1$ to $R_7$ are the same or are independently selected from H, $C_1$ to $C_3$ alkyls, and $C \equiv N$; and X is a $C_1$ to $C_{20}$ aliphatic or aromatic carbon, or polyether.

10. The rechargeable lithium battery of claim 9, wherein the polymer electrolyte composition comprises at least one ethylenically unsaturated monofunctional or multifunctional compound.

11. The rechargeable lithium battery of claim 9, wherein the polymerization initiator is an organic peroxide or an azo-based compound.

12. The rechargeable lithium battery of claim 11, wherein the polymerization initiator is selected from the group consisting of: peroxy dicarbonates selected from the group consisting of di(4-t-butylcyclohexyl) peroxydicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate 1,6-bis(t-butyl peroxycarbonyloxy) hexane; and diethylene glycol-bis(t-butyl peroxy dicarbonate); diacyl peroxides selected from the group consisting of diethylene glycol-bis(t-butyl peroxy carbonate), diacetyl peroxide, dibenzoyl peroxide, dilauroyl peroxide, and bis3,5,5-trimetyl hexanoyl peroxide; peroxy esters selected from the group consisting of t-butyl peroxy pivalate, t-amyl peroxy pivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3 -tetramethyl butyl 2-ethylhexanoate, t-amyl peroxy 2-ethyl hexanoate, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate; azo-based compounds selected from the group consisting of 2,2'-azo-bis(isobutyronitrile), 2,2'-azo-bis(2 ,4-dimethylvaleronitrile), and 1,1'-azo-bis(cyanocyclo-hexane); and combinations thereof.

13. The rechargeable lithium battery of claim 9, wherein the lithium salt is selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_xF_{2y+1}SO_2)$ where x and y are natural numbers, $LiSO_3CF_3$, and mixtures thereof.

14. The rechargeable lithium battery of claim 9, wherein the non-aqueous organic solvent is selected from the group consisting of carbonates, esters, ethers, ketones, nitriles and mixtures thereof.

15. The rechargeable lithium battery of claim 9, wherein the negative active material is a carbonaceous material.

16. The rechargeable lithium battery of claim 9, wherein the positive active material is a lithiated intercalation compound.

* * * * *

UNITED STATES PATENT AND TRADEMARK OFFICE
CERTIFICATE OF CORRECTION

PATENT NO.       : 7,452,634 B2                                      Page 1 of 2
APPLICATION NO.  : 10/948117
DATED            : November 18, 2008
INVENTOR(S)      : Yong-Beom Lee It is certified that error appears in the above-identified patent and that said Letters Patent is hereby corrected as shown below:

On the Title Page
(57) ABSTRACT, lines 6-15     Delete "

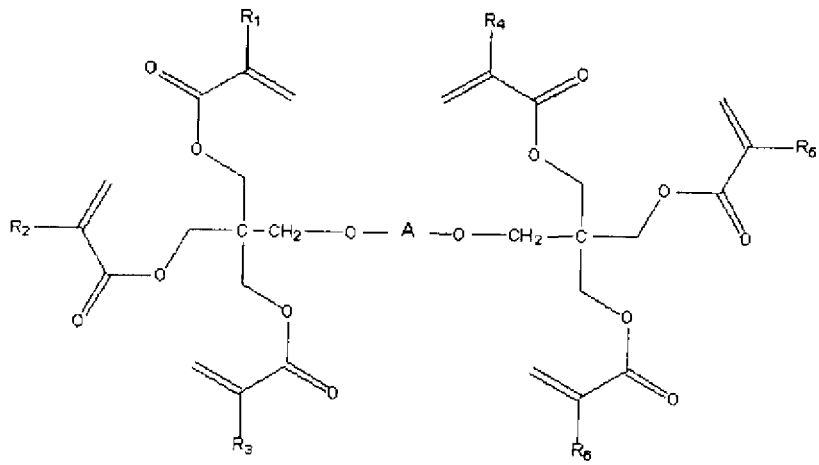

",

Insert --

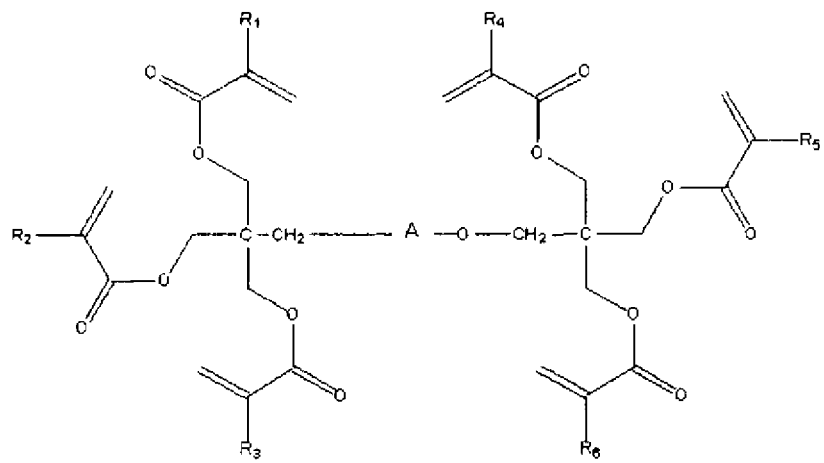

--

UNITED STATES PATENT AND TRADEMARK OFFICE
CERTIFICATE OF CORRECTION

PATENT NO. : 7,452,634 B2
APPLICATION NO. : 10/948117
DATED : November 18, 2008
INVENTOR(S) : Yong-Beom Lee It is certified that error appears in the above-identified patent and that said Letters Patent is hereby corrected as shown below:

In the Claims

| | |
|---|---|
| Column 8, line 51, Claim 7 | Delete "LiClO$_4$", Insert --LiClO$_4$-- |
| Column 8, lines 52-53, Claim 7 | Delete "(C$_y$F$_{2x+1}$SO$_2$)", Insert --(C$_y$F$_{2y+1}$SO$_2$)-- |
| Column 9, line 30, Claim 9 | Delete "1 to 10,", Insert --1 to 10;-- |
| Column 10, line 10, Claim 12 | Delete "bis3,5,5-trimetyl", Insert --bis-3,5,5-trimethyl-- |
| Column 10, lines 22-23, Claim 12 | Delete "(2    ,4-dimethylvaleronitrile)", Insert --(2,4-dimethylvaleronitrile)-- |
| Column 10, lines 28-29, Claim 13 | Delete "(C$_x$F$_{2y+1}$SO$_2$)", Insert --(C$_y$F$_{2y+1}$SO$_2$)-- |

Signed and Sealed this

Seventh Day of July, 2009

JOHN DOLL
*Acting Director of the United States Patent and Trademark Office*